United States Patent
Mabuchi et al.

[11] 3,923,549
[45] Dec. 2, 1975

[54] BATTERY CONNECTION DEVICE

[75] Inventors: Kenichi Mabuchi, Tokyo; Toshihisa Tsuchimochi, Ichikawa, both of Japan

[73] Assignee: Mabuchi Motor Co. Ltd., Tokyo, Japan

[22] Filed: Oct. 24, 1974

[21] Appl. No.: 517,528

[30] Foreign Application Priority Data

Oct. 29, 1973  Japan.................... 48-125181[U]

[52] U.S. Cl. ............................. 136/134 P; 136/173
[51] Int. Cl.[2].................... H01M 13/10; H01M 1/04
[58] Field of Search ............ 136/173, 134 R, 134 P, 136/135 R, 135 S

[56] References Cited

UNITED STATES PATENTS

| | | | |
|---|---|---|---|
| 2,901,526 | 8/1959 | Huntley et al. ..................... | 136/173 |
| 3,783,030 | 1/1974 | Tietze ............................. | 136/134 P |
| 3,859,140 | 1/1975 | Schmidt ........................... | 136/173 |

*Primary Examiner*—Howard S. Williams
*Assistant Examiner*—H. A. Feeley

[57] ABSTRACT

A battery connection device for a battery source cassette using a plurality of assembled cells, wherein the electrical connection between the individual cells is insured by conductive cell caps which not only connect the individual cells but serve to facilitate the discharge of gas which may emanate from the electrode regions of the cells.

3 Claims, 4 Drawing Figures

BATTERY CONNECTION DEVICE

BACKGROUND OF THE INVENTION

1. Field of the Invention

This invention relates to battery connection devices and, more particularly, to a battery connection device in a battery source cassette using a plurality of assembled cells, in which the electrical connection between the individual cells is insured by electrically conductive connecting caps which also serve to facilitate the discharge of gas which may emanate from the electrode regions of the cells.

2. Description of the Prior Art

In battery source cassettes using an assembly of electric cells, it is customary to have the cells connected in series. In such a case, the resistance loss due to the contact resistance between the cells may become large when a large discharge of current flows through the cells.

Recent developments in nickel-cadmium type cells have brought forth the so-called quick-chargeable cells which have a low enough internal resistance to afford a discharge current of as high as several amperes and which may be recharged in a matter of a few minutes. This kind of cell is usually equipped with a gas discharging means such as a relief valve for facilitating the escape of the gas produced when the cell is overcharged.

When such cells are used in an assembled arrangement, it is required to have the contact resistance between the cells as small as possible, although this requirement is not necessarily limited to the quick-chargeable type of cells.

SUMMARY OF THE INVENTION

It is an object of the present invention to solve the above mentioned problem by providing a battery connection device employing electrically conductive connecting caps welded to opposed cell electrodes whereby to make the contact resistance small and also to facilitate the escape of gas which may emanate from the electrode regions of the cells.

It is a further object of the invention to provide a cell connection device in a battery source cassette using an assembly of cells connected in series.

BRIEF DESCRIPTION OF THE DRAWINGS

These and other objects of the invention will become apparent from the following detailed description thereof and from the accompanying drawings, in which.

DETAILED DESCRIPTION OF THE EMBODIMENT

Figure 1:
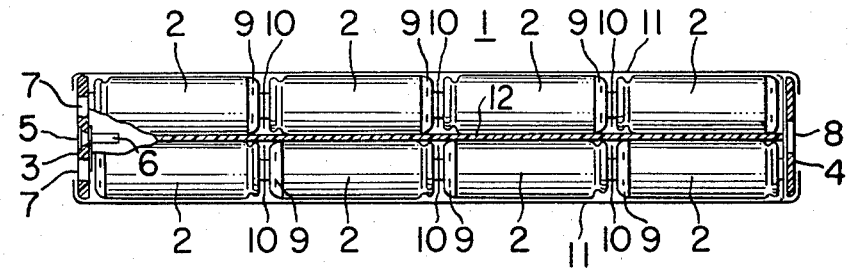
FIG. 1 is a plan view, in cross-section, of a battery source cassette incorporating two rows of assembled cells.

Reference is made herein to our copending application filed concurrently herewith and entitled "Battery Cassette Power Source Device", in which most of the elements illustrated in the present application are shown and fully described. Thus, with reference to said copending application and to the accompanying drawings, character numeral 1 denotes generally the battery source cassette, which comprises a number of cells 2, an insulating end plate 3 which also serves as the socket base, an opposite end plate 4, socket apertures 5 in said plate 3, a socket 6 for the terminal cells. Apertures 7 in the plate 3 serve the purpose of welding the terminals of the cells and also as ventilating holes. The opposite rear plate 4 has therein an aperture 8. Cupshaped conductive connecting caps 9 are provided for connecting the individual cells to one another and insulating washers 10 are associated therewith. A thermocontractive vinyl resin 11 covers entirely the battery source cassette, and a longitudinal cassette separator 12 separates the two rows of cells from each other.

Figure 4:
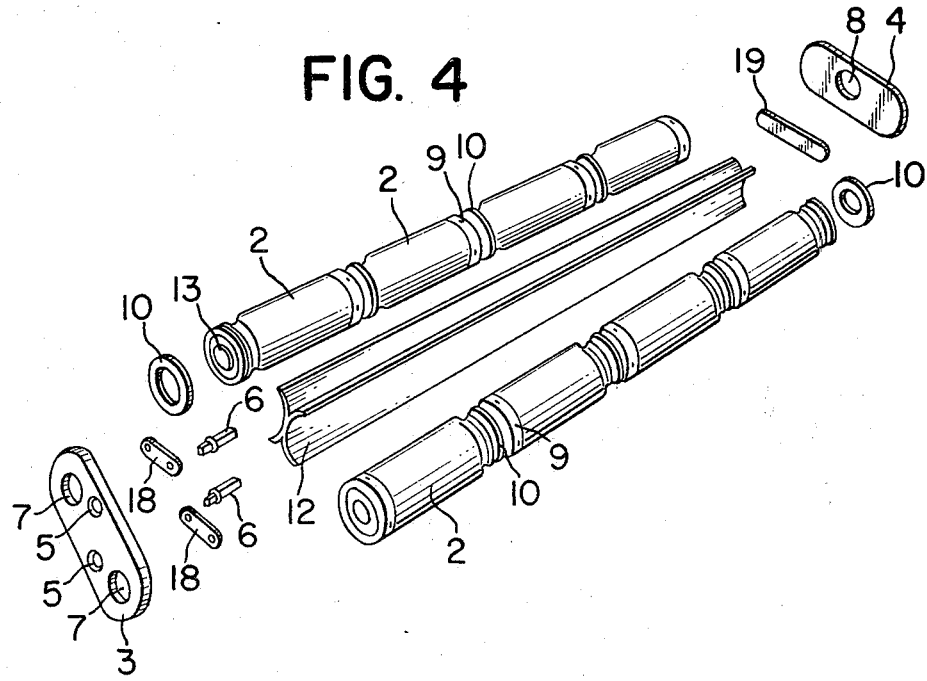
FIG. 4 is an exploded perspective view of the battery source cassette shown in FIG. 1.

As shown in FIGS. 1 and 4, the cells 2 are connected in series by welding the connecting caps 9 thereto. They are then placed against both longitudinal sides of the separator 12 and packed entirely within the thermo-contractive vinyl resin 11 with end plates 3 and 4 attached in position.

The end plate 3 as stated above is provided with socket apertures 5 for the sockets 6 providing for electrical connection and with apertures or accesses for welding the terminals. Conversely, the rear plate 4 is provided with aperture 8 for releasing the gas discharged from the cells 2. In FIG. 4, reference numerals 18 show the connecting plates for connection between the sockets 6 and the battery terminals, while numeral 19 shows an electrically conductive element for the connection between the individual cells.

Figure 2:
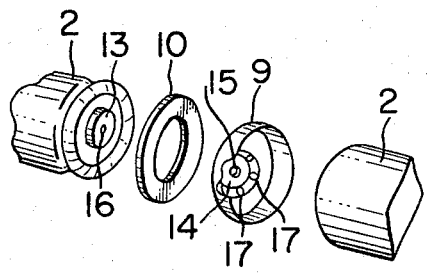
FIG. 2 is an exploded perspective view of a battery connection means embodying the invention.
Figure 3:
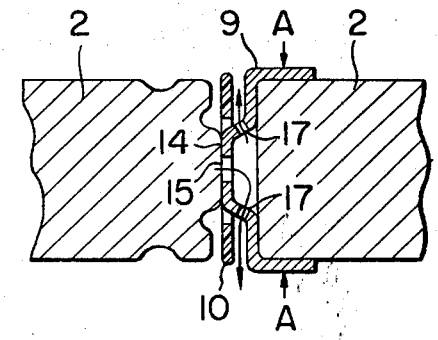
FIG. 3 is a longitudinal cross-sectional view showing how the connection between two cells is made.

FIG. 2 is an exploded perspective view showing the manner of connecting the individual cells in accordance with the invention and FIG. 3 illustrates two cells in connected condition. To the positive terminal 13 of cell 2 there is welded a cup-shaped electrically conductive connecting cap 9 at the central projecting portion 14 thereof. An insulating washer 10 is disposed therearound, while the central projecting portion 14 is provided with an aperture 15 to allow free escape of the gas from the discharge hole 16 of cell 2, formed at the positive terminal 13 of the cell. Also in the curved region of the said central projecting portion 14, there are formed openings 17 to permit the issuance of the discharged gas as shown by the arrows.

The connecting cap 9 is welded to the positive terminal 13 of one cell and is snugly fitted over the casing of the adjacent cell which constitutes the negative terminal thereof. The peripheral portion of connecting cap 9 is then spot-welded to the casing of said adjacent cell, as shown at A in FIG. 3.

The insulating washer 10 prevents the casing of one cell from accidentally contacting the casing of the adjacent cell, thus causing an inadvertent short-circuiting of the battery.

As can be seen from the foregoing description, the connecting caps 9 of the invention are welded to the positive and to the negative terminals of any two adjacent cells respectively, so as to form series connection of the cells, making the contact resistance therebetween and uniting the cells with sufficient mechanical strength to facilitate the assembly of the battery source cassette as shown in FIG. 1. Moreover, since the connecting cap 9 is provided with a central projecting portion 14 having openings 15 and 17 therein, blocking of the gas discharge aperture provided in the positive terminal of a cell is prevented and the discharged gas is allowed to escape freely.

What is claimed is:

1. In a battery source cassette having a plurality of cells, the improvement comprising a cup-shaped, electrically conductive cell-connecting cap having a central projecting portion provided with apertures therein and a skirt portion, said central projecting portion being welded to an electrode portion of a first cell and said skirt portion being welded to an electrode portion of a second cell adjacent to said first cell.

2. A battery connection device as claimed in claim 1, in which said apertures in said connecting cap are formed in the curved part of said central projecting portion.

3. A battery connection device as claimed in claim 1, in which an insulating washer is interposed between the cell welded to said central projecting portion and the skirt portion of said cup-shaped, electrically conductive, connecting cap.

* * * * *